United States Patent [19]

Kraft et al.

[11] Patent Number: 4,502,342

[45] Date of Patent: Mar. 5, 1985

[54] PULSED DRIVE MEANS FOR SHAKER

[75] Inventors: Jack A. Kraft, New Hyde Park; Harold D. Kraft, Flushing, both of N.Y.

[73] Assignee: Templeton Coal Company, Inc., Terre Haute, Ind.

[21] Appl. No.: 349,033

[22] Filed: Feb. 16, 1982

[51] Int. Cl.$^3$ ........................ F16H 21/44; B07B 1/42; B01F 11/00

[52] U.S. Cl. ........................................... 74/26; 74/96; 366/276

[58] Field of Search ............................. 74/26, 96, 470; 366/276, 278, 243, 295

[56] References Cited

U.S. PATENT DOCUMENTS

| | | | |
|---|---|---|---|
| 817,192 | 4/1906 | Rock | 366/276 |
| 831,912 | 9/1906 | Wadsworth | 78/26 |
| 897,065 | 8/1908 | Cupp et al. | 366/276 |
| 1,011,680 | 12/1911 | Wall | 74/26 |
| 1,577,310 | 3/1926 | Sutton et al. | 74/26 |
| 1,593,730 | 7/1926 | Stebbins | 74/26 |
| 1,711,955 | 5/1929 | Larson | 366/276 |
| 3,046,799 | 7/1962 | Ash et al. | 74/96 |

FOREIGN PATENT DOCUMENTS

| | | | |
|---|---|---|---|
| 424875 | 3/1935 | United Kingdom | 366/276 |

*Primary Examiner*—Leslie A. Braun
*Assistant Examiner*—Michael J. Gonet
*Attorney, Agent, or Firm*—Peter L. Berger

[57] ABSTRACT

A pulsed shaker shocker is provided in which an intermittent pulsed action is provided to the containers carrying liquid to enhance the shaking action for the liquid carried in the containers. Such shaking action is found for separatory type shakers, and the pulsed action enables a more efficient shaking action to be obtained. The pulsed nature of the shaker shocker more closely resembles the manual shaking action, and this way, more efficient shaking may be obtained.

4 Claims, 5 Drawing Figures

FIG. 3
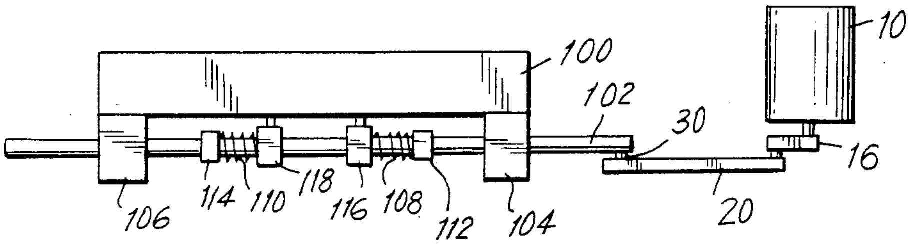
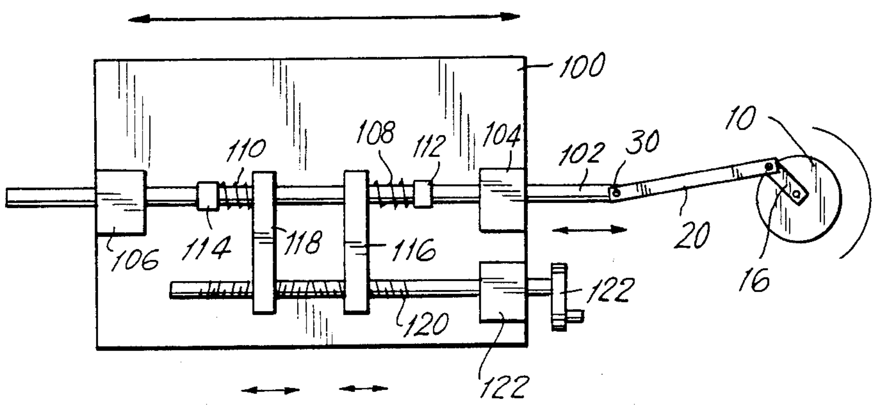
FIG. 4
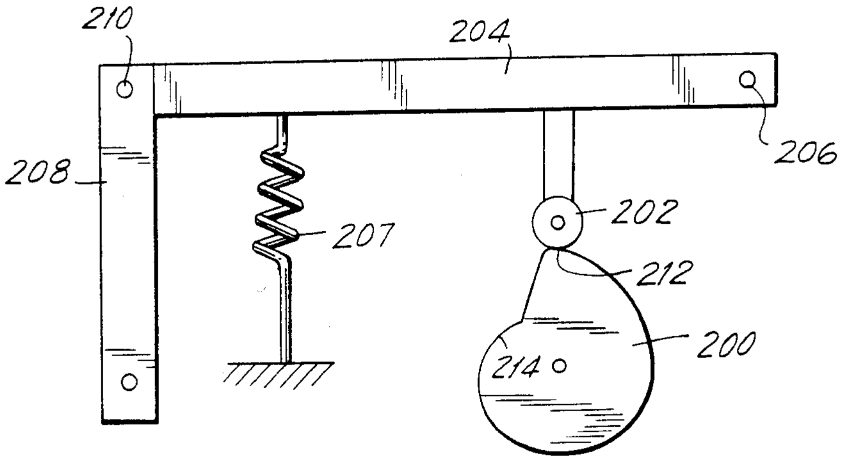
FIG. 5

PULSED DRIVE MEANS FOR SHAKER

PRIOR ART STATEMENT

Submitted herewith is a photocopy of an apparatus sold by Kraft Apparatus, Inc. of Mineola, N.Y. 11501. This apparatus is representative of prior shakers, but such shakers impart a sinusodial motion to the containers carried therein. The present invention interposes a coupling means between the conventional drive and the driven platform so as to provide a pulsed action for the platform and containers carried thereby. Such a pulsed action is neither found, suggested nor shown in the prior art.

BACKGROUND OF THE INVENTION

This invention relates to a shaker apparatus for containers, and more particularly, to a shaker apparatus in which a shocking motion is provided to the container.

Shakers are manufactured in which an arm-shaking motion is imparted to separatory funnels, flasks, stoppered test tubes, bottles and assorted glassware. The shaker apparatus is suitable for extractions, shaking or mixing in standard laboratory procedures. A reciprocating shaker is manufactured in which a plurality of containers are secured to a platform, and each of the containers is capable of receiving automatic shaking action. Sometimes, strata or incomplete mixing is formed by the ineffectiveness of the shaking motion.

Such shaker units are generally driven by a motor which provides a sinusodial, reciprocating or oscillatory motion to the platform which carries the containers thereon. Such sinusodial motion resembles that of the manual handshaking, but manual handshaking motions are more jarring than smooth. Consequently, for some shaking or mixing procedures, the prior art shaker apparatus is inadequate because of the smooth uniform motion.

A shaker apparatus of the type generally described above is sold by Kraft Apparatus, Inc. of Mineola, N.Y., and a photocopy of such apparatus is submitted herewith as prior art.

An object of this invention is to provide an improved shaker apparatus in which the shaking motion more resembles true manual shaking than the continuous sinusoidal motion of the prior art to collapse the strata formed in prior art mixers. A continuous reciprocating sinusoidal motion is converted to a pulsed drive in order to impart a jarring action to the platform carrying the containers in which the liquid is to be mixed or shaken.

Another object of this invention is to provide such a shaker which may be readily adapted to conventional prior art shakers, so as to find widespread use.

Yet another object of this invention is to provide a drive means which may be adapted to other type shakers in which a pulsed drive is imparted to a platform carrying containers in which liquid is mixed.

Other objects, advantages and features of this invention will become more apparent from the following description.

SUMMARY OF THE INVENTION

In accordance with the principles of this invention, the above objects are accomplished by providing a pulsed drive means for a platform carrying containers holding liquid to be mixed, drive means comprising a motor which provides a continuous rotary motion, a drive arm means connected to and driven by the motor, and coupling means coupling the motor to the platform, the coupling means converting the continuous rotary motion of the motor to a shocking or jarring drive for the platform. Several embodiments are illustrated for imparting a shock drive to such platforms, and these will become more apparent from the following descriptions. Due to this new shocking motion, the strata previously formed are collapsed, thereby producing a top to bottom mix in addition to the regular reciprocating mixing. The liquids are violently thrown into each other for better dispersion and extraction.

DESCRIPTION OF THE DRAWINGS

FIG. 3 is an illustrative end view of another embodiment of this apparatus in which a rotary motor motion is coupled to a load platform to drive the load platform.

FIG. 4 is a bottom view of the apparatus of FIG. 3.

FIG. 5 is yet another embodiment of this invention in which a cam and cam follower is utilized to impart the pulsed motion to the platform.

DETAILED DESCRIPTION

Figure 1:
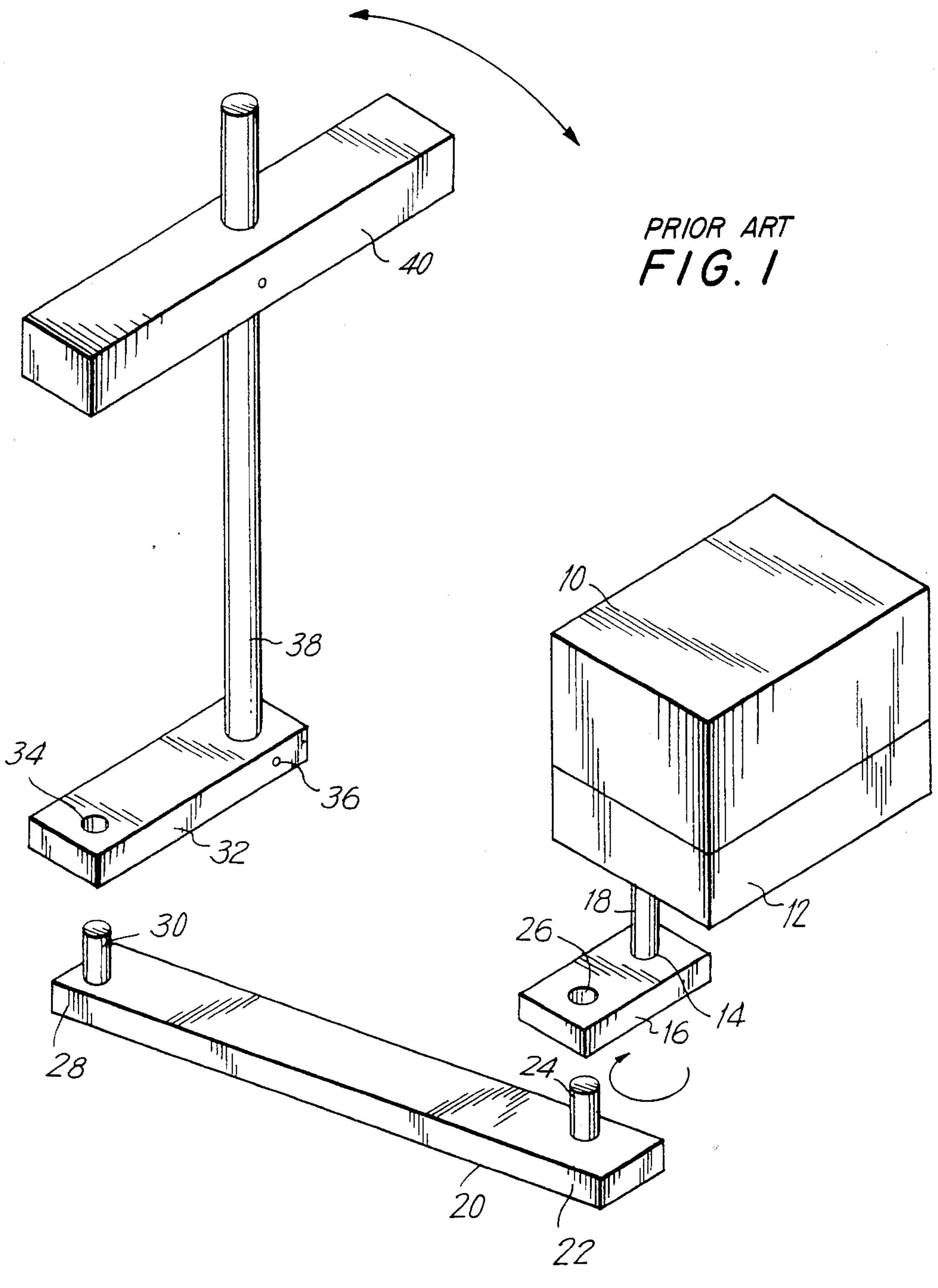
PRIOR ART FIG. 1
FIG. 1 is a perspective diagramatic drawing illustrating the conventional drive mechanism for the prior art shaker.

FIG. 1 illustrates the drive mechanism used to drive the shaker of the prior art, which has been identified as that manufactured by Kraft Apparatus, Inc. In particular, a motor 10 provides a continuous rotary motion, which motion is coupled through gear box 12 to one end 14 of a crank arm 16. A shaft 18 is coupled to said one end and pivotally rotates in an aperture at said one end 14. The rotary motion of crank arm 16 is imparted to a connecting rod 20 by coupling one end 22 of connecting rod 20 through a coupling pin 24 which is connected in an aperture 26 at the other end of crank arm 16. The rotary motion of motor 10 is carried through to connecting rod 20 through crank arm 16, and connecting rod 20 is connected at its other end 28 through a connecting pin 30 to a driven arm 32, with connecting pin 30 being coupled into an aperture 34 which is located at one end of driven arm 32. The other end 36 of driven arm 32 carries a shaft 38 which is fixedly connected to said driven arm, the shaft receiving an oscillatory sinusodial motion when the motor 10 rotates. The platform 42 (see FIG. 2) carrying the containers is connected to the oscillating shaft 38.

Figure 2:
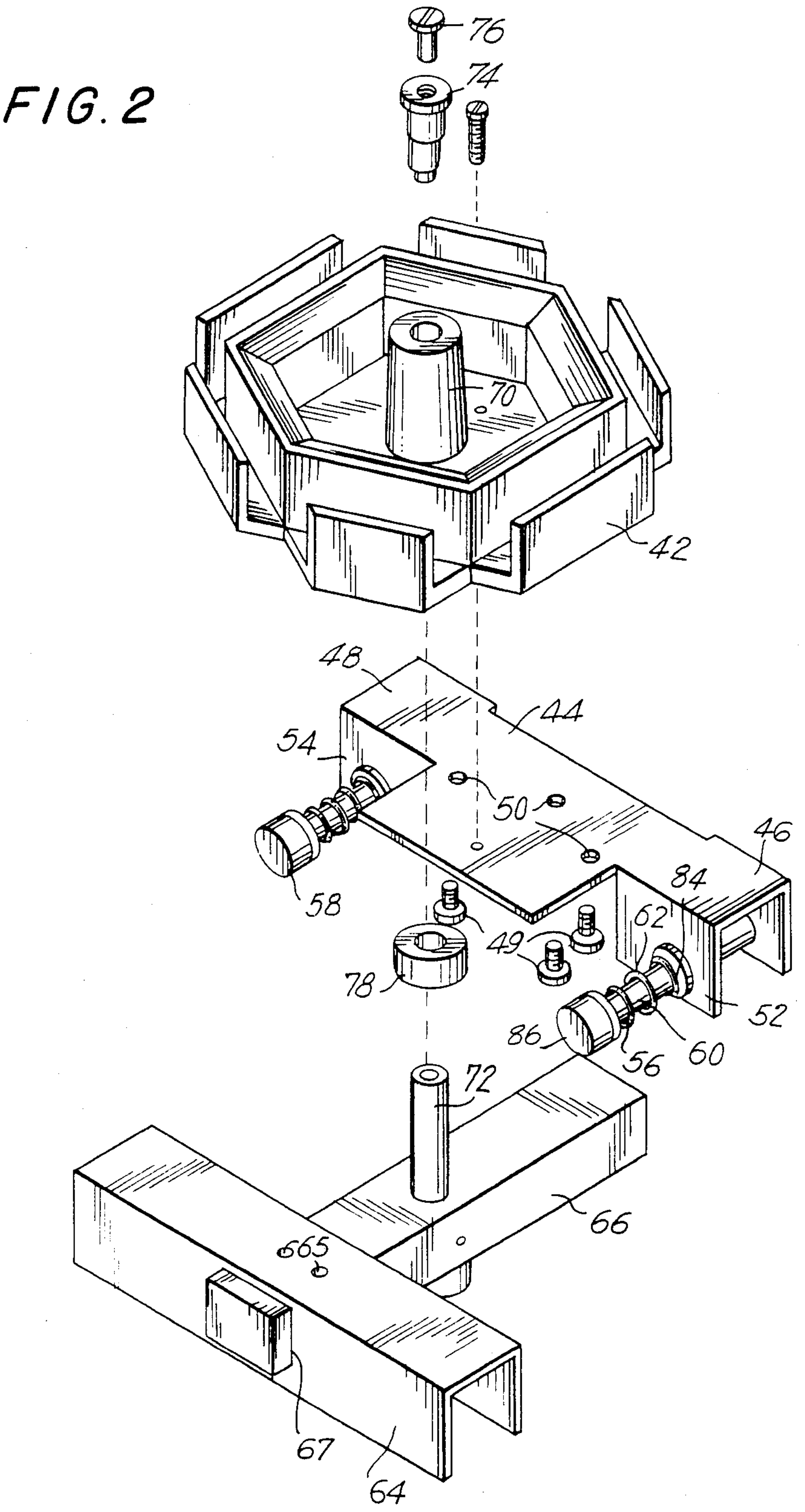
FIG. 2 is an illustration of an embodiment of the present invention which is adapted to be attached to the drive mechanism of FIG. 1 to provide the Shaker Shocker action.

FIG. 2 illustrates one embodiment of the present invention. Platform 42 carries the containers in which liquid is to be mixed and is coupled to be driven by an oscillating load carrier 40. A plunger frame 44 having opposite ends 46 and 48 is mounted to the underside of load carrier 40 by screws 49 connected through apertures 50 in plunger frame 44. Plunger frame 44 is a one piece unit and includes at its opposite ends, U-shaped channels 52 and 54, respectively, carrying rubber tipped spring loaded plunger mechanisms 56 and 58, respectively. Each rubber tipped spring loaded plunger comprises a rod 60, a coil spring 62 wound around said rod, with one end 84 of said coil spring abutting one leg of the U-shaped channel. The other end of said spring 62 abuts a rubber tip 86 and rubber tip 86 is movable with respect to rod 60 because of the action of coil spring 62.

Load carrier 40 is indirectly connected to drive platform 42. The plunger frame is used to convert the conventional oscillatory motion of the shaft 38 to a shocking motion. In particular, this pulsed motion is accomplished by providing a bracket 64 formed of a U-shaped channel member spanning across the ends of plunger frame 44 and located opposite to the spring loaded plungers 56. A bracket 64 is adjustably attached to a drive bar 66. Drive bar 66 serves the same function as load carrier 40 of FIG. 1. Adjustable bracket 64 is fixed by means of screws 65 on drive bar 66, while shaft 38 (FIG. 1) and bracket 64 oscillate. In the prior art, shaft 38 directly drives platform 42, while in the present invention, the coupling means formed of plunger frame 44, adjustable bracket 64 and drive shaft 72 now powers platform 42 to provide the intermittent shocking motion. Drive shaft 72 is loosely connected to post 70 of platform 42 together with drive shaft extension member 74 which fits within post 70 and is fixedly connected to drive shaft 72 by an assembly screw 76. A thrust washer 78 is loaded onto drive shaft 72 between the drive shaft and post 70 which is part of platform 42. Adjustable bracket 64 is slidable inwardly or outwardly along the drive bar 66 by means of set screws 65 which fix the position of the bracket on the drive bar. Adjustable bracket 64 has a central aperture 67 which conforms to the shape of drive bar 66, said aperture allowing said bracket to slide on said drive bar to be fixed in a desired position.

The invention operates as follows: shaft 38 provides an oscillatory motion to drive bar 66. This oscillatory motion is imparted to bracket 64. As bracket 64 oscillates, it hits against rubber tipped spring loaded plungers 56 and 58 of plunger frame 44. Each time the rubber tipped spring loaded plunger bumps against adjustable bracket 64 the oscillatory motion imparted of drive shaft 38 is converted to a shocking or jarring motion. This shocking motion is then carried to platform 42 because plunger frame 44 is fixedly connected to platform 42. As described above, adjustable bracket 64 may be fixed in position on drive bar 66 with respect to the location of the rubber tipped spring loaded plungers, so as to adjust the impact of the bump as a plunger hits against adjustable bracket 64.

Although FIG. 2 illustrates one embodiment of this invention in which the pulsed type motion is imparted to a oscillating platform, other embodiments of this invention are set forth hereinafter.

FIGS. 3 and 4 illustrate another embodiment of this invention in which the containers to be mixed (not shown) are carried on a load platform 100. Similar numerals are used to identify similar parts as found in FIG. 1, and thus, a rotary motor 10 drives a crank arm 16 which in turn drives a connecting rod 20. Connecting rod 20 is coupled at pin 30 to a reciprocating rod 102 which reciprocates in movement beneath load platform 100. The motor driven reciprocating rod 102 freely slides beneath load platform 100 through bushings 104 and 106 affixed to the platform at opposite ends thereof. A pair of coiled springs 108 and 110 are mounted on reciprocating rod 102. The outer end of each of the coiled compression springs is captured between collar 112 and bar 116 and collar 114 and bar 118. The inner ends of the springs are adapted to bump against an abutment means, which will be described in more detail hereinafter. Abutment means is comprised of a pair of abutment plates 116 and 118 adapted to be bumped by the inner ends of spring members 108 and 110, respectively. As reciprocating rod 102 moves right and left, the inner ends of springs 108 and 110 bump against abutment plates 116 and 118, respectively. These abutment plates are carried on an adjustment rod 120 which itself is coupled to a drive block 122. Drive block 122 is fixed to load platform 100 and drives load platform in accordance with the pulsed motion imparted to adjustment rod 120 through the action of springs 108 and 110 bumping against abutment plates 116 and 118, respectively. Abutment plates 116 and 118 are threadedly connected on adjustment rod 120, and an adjustment knob 122 connected to one end of adjustment rod 120 may be rotated to cause abutment plates 116 and 118 to shift in position closer or further apart along the adjustment rods as the adjusting knob 122 is rotated. In this way, the amount of thrust imparted to adjustment rod 120 may be varied as adjusting knob 122 is rotated.

FIG. 5 illustrates another embodiment of this invention. In this embodiment, the rotating motion of motor 10 has not been illustrated, but a cam 200 is attached to receive the continuous rotary motion of a motor. The shaft of the motor is coupled to drive cam 200 in a continuous rotary motion. A cam follower 202 follows the contour of cam 200, and cam follower 202 is connected to an arm 204, one end of which is connected to a pin 206. The fixedly connecting of arm 204 at its one end by pin 206 allows the other end to move in an upward and downward motion as cam 200 rotates. The spring 207 is connected to the left end of arm 204 to partially absorb the shock of the pulsed motion imparted to arm 204. A drive linkage 208 is hingedly connected to arm 204 as at 210, and a platform (not shown) is coupled to the drive linkage 208 to receive the pulsed motion imparted thereto. The embodiment of FIG. 5 works in the following fashion. As cam 200 rotates, follower 202 goes through an abrupt motion as cam 200 rotates, in accordance with the contour of the cam. As the follower drops from the larger outer radial segment 212 to the smaller inner radial segment 214, arm 204 also drops abruptly causing an abrupt motion to drive linkage 208. Shock absorber 207 absorbs some of the shock of the abrupt motion of arm 204, and this abrupt pulsed motion is then carried to a table on which containers carrying liquid to be mixed or shaken are carried.

The present invention has been illustrated with respect to several embodiments in this application. Modifications of the Shaker Shocker or pulsed drive mechanism of this invention will be apparent to those of skill in the art.

What is claimed is:

1. A pulsed drive means for a platform carrying containers holding liquid to be mixed, said drive means comprising a motor providing a continuous rotary motion to the motor shaft, coupling means connected to said motor shaft converting said rotary motion to an oscillatory sinusoidal motion, said coupling means connected to an elongated plunger frame to provide said oscillatory sinusoidal motion to said plunger frame, said coupling means including a driven arm, a drive shaft coupled to an end of said driven arm, and being driven in an oscillatory rotary motion by said driven arm, said plunger frame being connected to said drive shaft to be rotatably driven thereby, said plunger frame carrying said platform, said plunger frame comprising opposite ends, a spring member attached perpendicularly from a respective opposite end of said plunger frame extending parallel to each other, said spring members projecting in the direction of rotation of said drive shaft, a bracket member fixedly attached with respect to said drive shaft such that said bracket remains fixed as said plunger frame reciprocates, said projecting spring members bumping against said bracket as said plunger frame reciprocates and providing said pulsed drive to said platform.

2. A pulsed drive means as claimed in claim 1, wherein said bracket is adjustable with respect to said spring member to adjust the bumping impact.

3. A pulsed drive means as claimed in claim 2, wherein each of said spring members comprises a rubber tipped spring loaded plunger comprising a rod attached to said plunger frame, a coiled spring coiled about said rod and fixedly held at one end to said rod, and a rubber tip connected to the other of said coiled spring.

4. A pulsed drive means as claimed in claim 1, wherein each of said spring members comprises means to damp the sound when said projecting spring member bumps against said bracket.

* * * * *